W. W. ROACH.
BRAKE.
APPLICATION FILED MAR. 31, 1917.
1,278,081.
Patented Sept. 3, 1918.
5 SHEETS—SHEET 4.
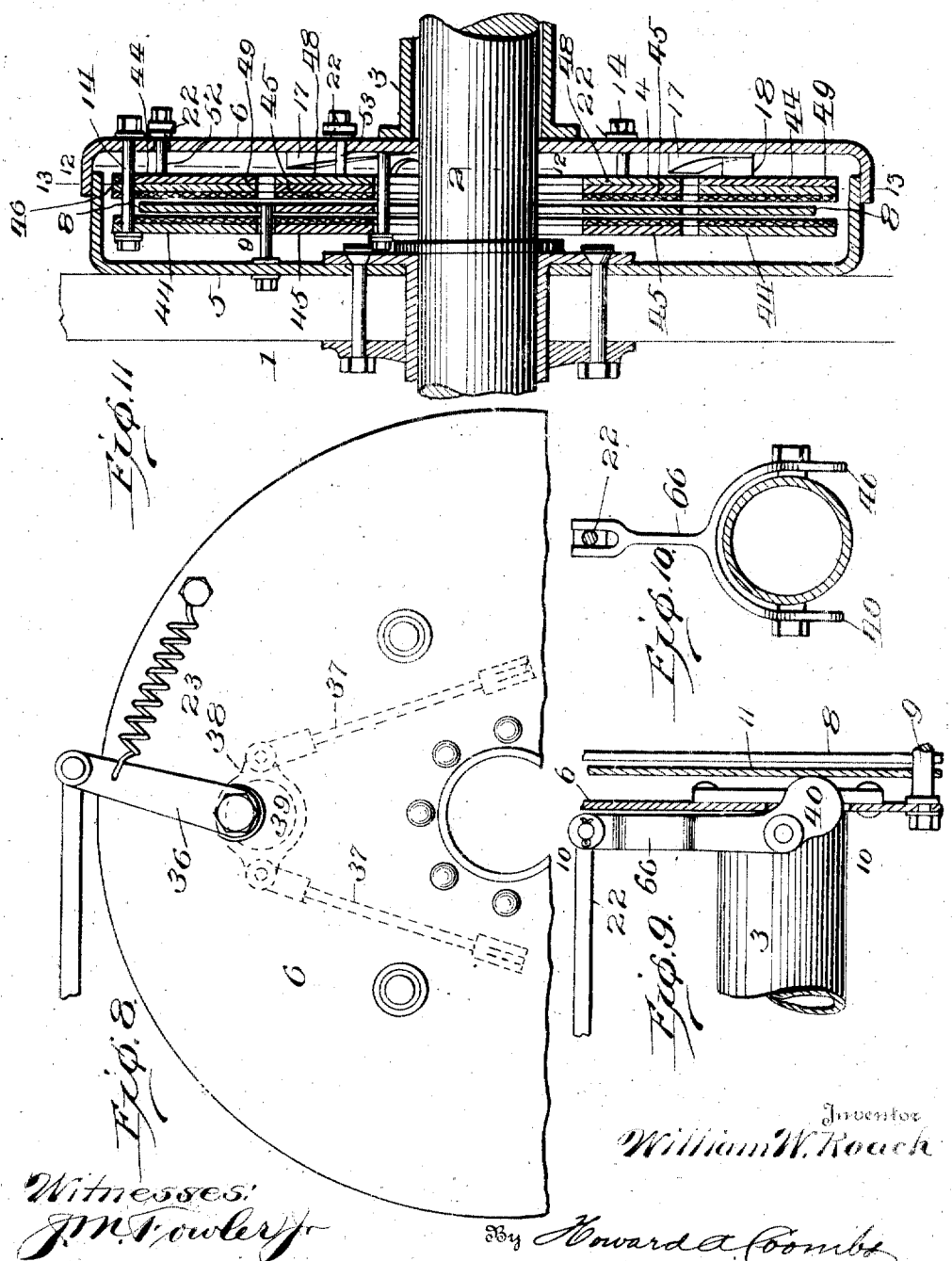
Witnesses:
J. W. Fowler Jr.
Inventor
William W. Roach
By Howard A. Coombs
his Attorney

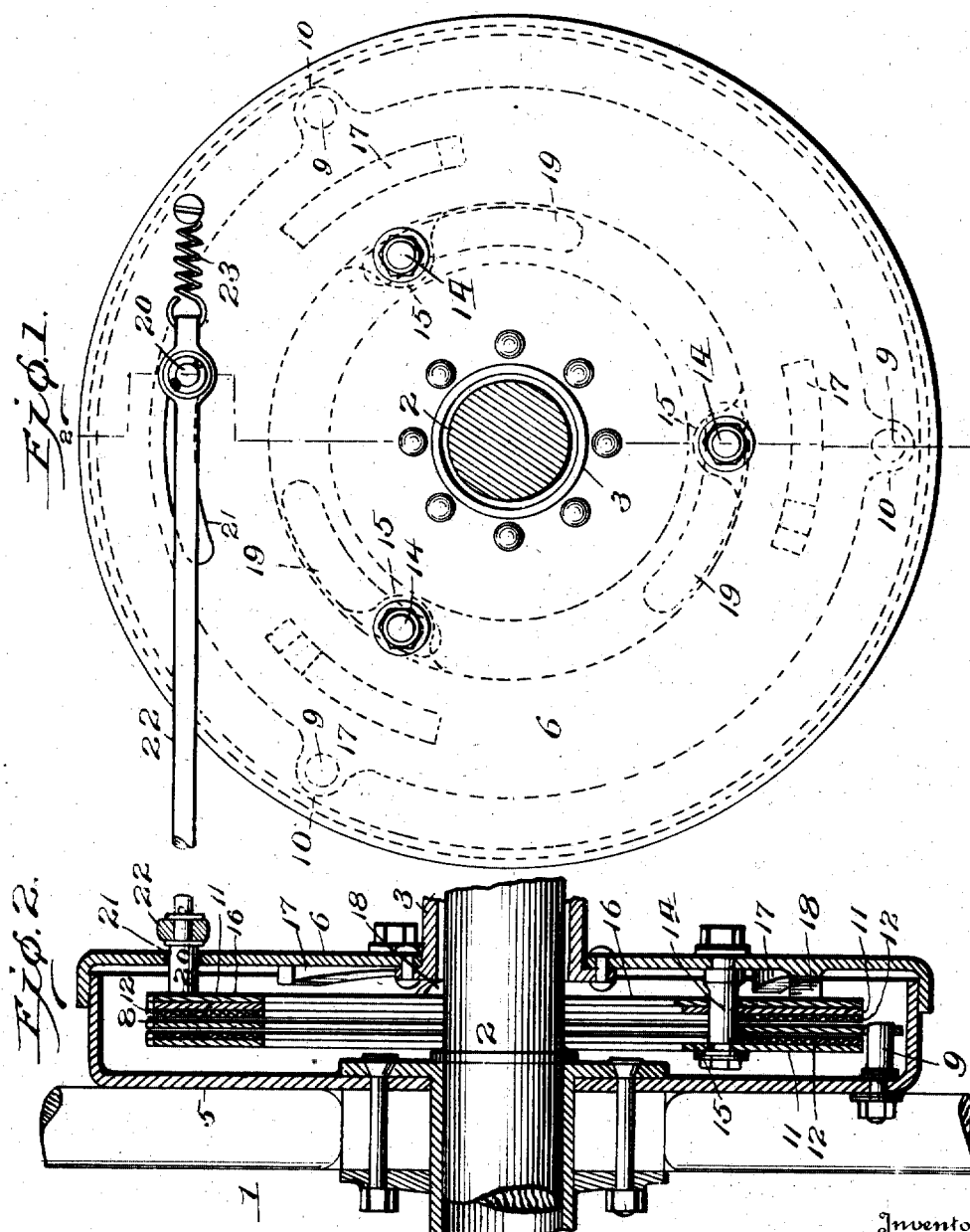

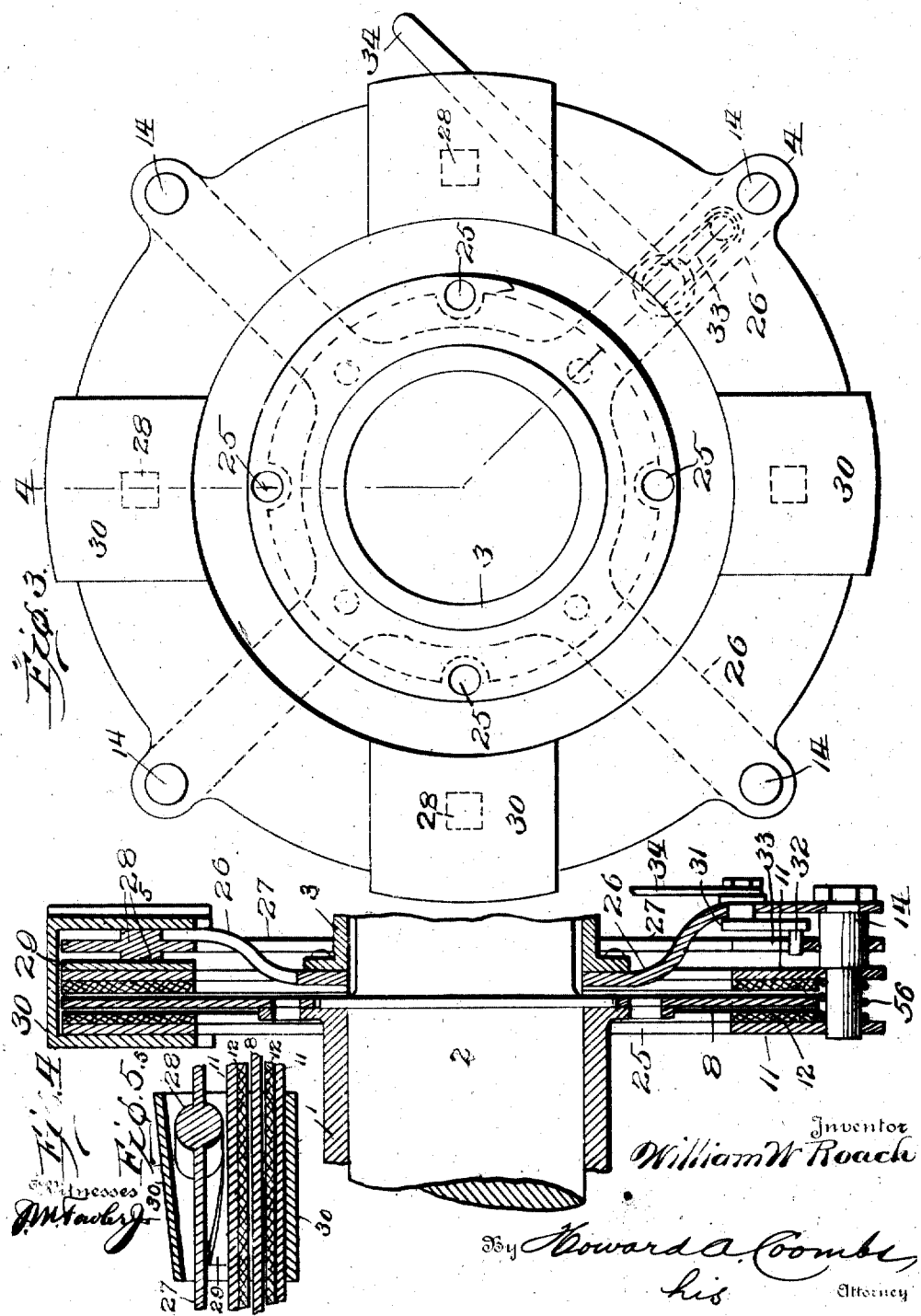

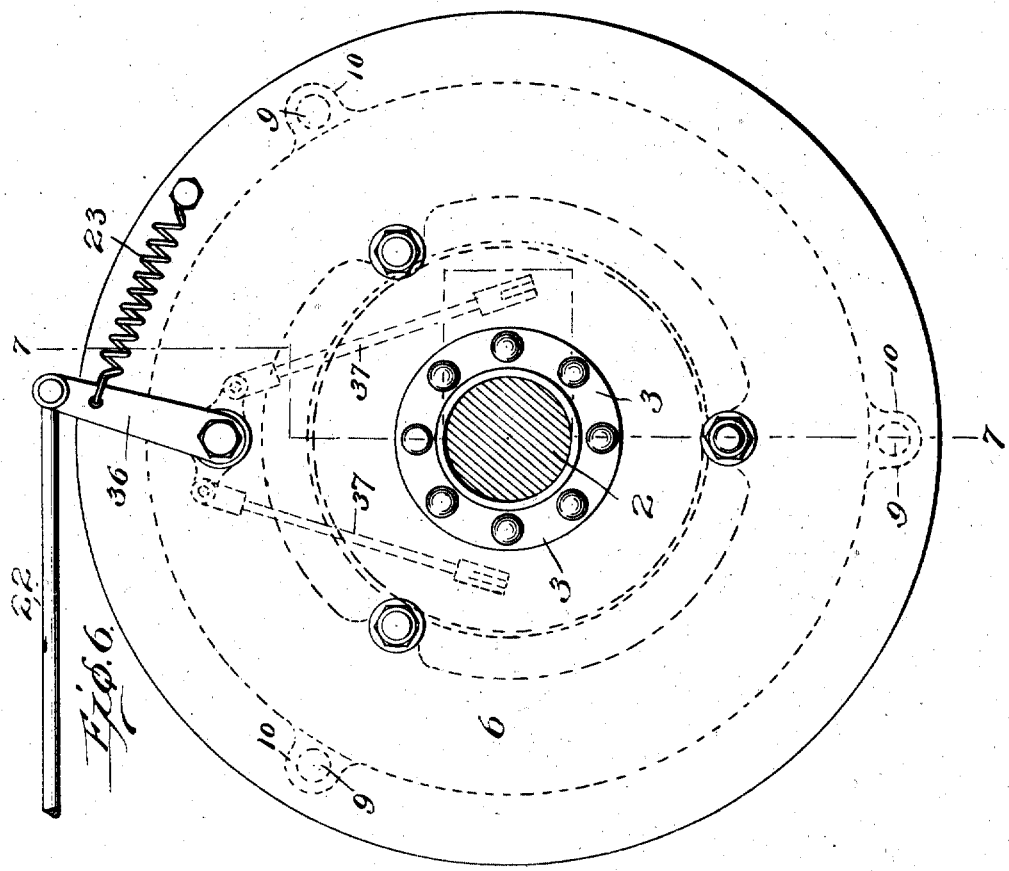

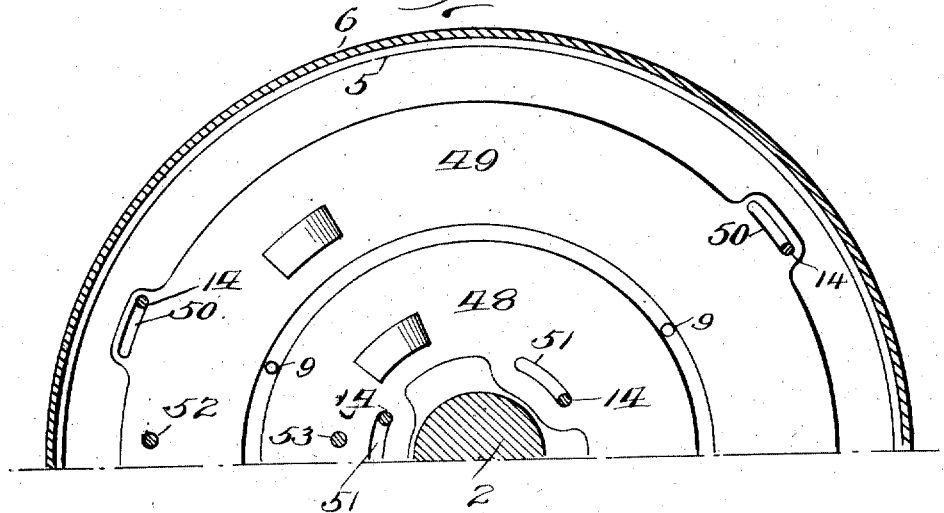
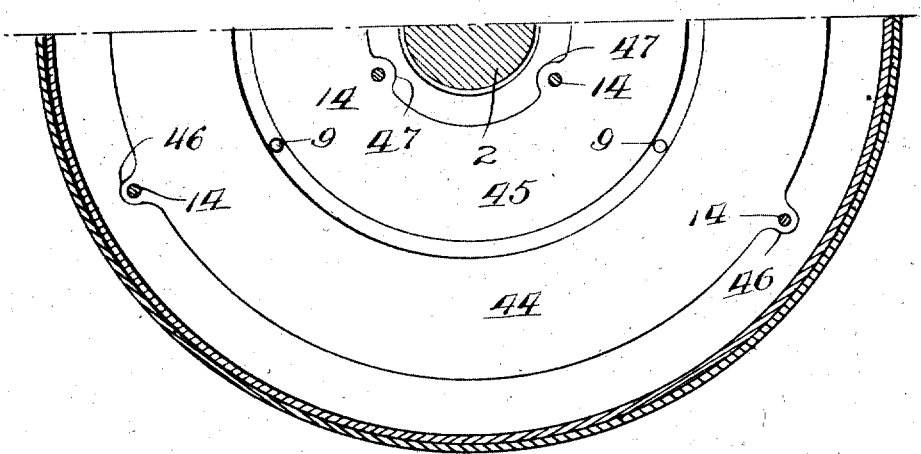

UNITED STATES PATENT OFFICE.

WILLIAM W. ROACH, OF PHILADELPHIA, PENNSYLVANIA.

BRAKE.

1,278,081.  Specification of Letters Patent.  Patented Sept. 3, 1918.

Application filed March 31, 1917. Serial No. 158,854.

*To all whom it may concern:*

Be it known that I, WILLIAM W. ROACH, a citizen of the United States, residing at Philadelphia, in the county of Philadelphia and State of Pennsylvania, have invented new and useful Improvements in Brakes, of which the following is a specification.

This invention relates to brakes and consists in the improvements hereinafter described and claimed. It is designed particularly for use as a brake for the driven wheels of motor vehicles, but it is adapted to other uses. As used on motor vehicles, it presents the great advantage that the wheels can be taken off and put back without in any way disturbing the brake, in other words the wheels can be moved axially independently of the brake, and when any of the friction members of the brake need renewal, it is only necessary to remove the wheel, whereupon the brake members are directly accessible for removal and replacement.

In one embodiment of my invention, the brake is double, that is, comprises two sets of non-rotatable friction members of different diameter, coöperating with one and the same rotary member, thereby in effect providing two brakes, one stronger than the other, and which can be independently operated, as by a foot pedal and a hand lever respectively.

Several modifications are illustrated in the drawings,

Figure 1 being an end view, and

Fig. 2 a section on the line 2—2 of Fig. 1, of one form;

Fig. 3 an end view,

Fig. 4 a section on the line 4—4 of Fig. 3, and

Fig. 5 a section on the line 5—5 of Fig. 4, of another form;

Fig. 6 is an end view of a modification;

Fig. 7 a section on the line 7—7 of Fig. 6;

Fig. 8 is a partial end view of another modification;

Fig. 9 an elevation and partial section of another, and Fig. 10 a section of the same on the line 10—10;

Fig. 11 a cross section of the double form of brake, and

Figs. 12 and 13 half end sections of the same, taken on the lines 12—12 and 13—13 respectively.

In these views I have shown the brake as applied to the wheel of a motor vehicle, 1 representing such wheel and 2 its driving shaft, 3 being part of the frame, *i. e.*, of the fixed rear axle. To the hub of the wheel is secured a circular plate 5, the edge of which is flanged and overlaps, or is overlapped by, the flange of a similar plate 6, secured to the stationary member 3. Said flanged plates constitute a casing or housing for the brake. The brake comprises, as usual, a rotary member or members and a non-rotatable member or members. In the present instance, it being a disk brake, there is always one or more non-rotatable member than rotary members. For simplicity's sake, I have shown only one rotary member but, of course, there may be two or more such, and a correspondingly increased number of non-rotatable members. The rotary member is an annular disk 8, which is supported and caused to rotate with the wheel by means of studs 9,—preferably three in number as shown,—secured in the plate 5 and passing through holes in said disk. In the forms shown in Figs. 1 and 2 and in Figs. 6 and 7, the holes for the studs are formed in lugs 10 projecting outwardly from the periphery of the disk. The non-rotatable members of the clutch consist of rings 11, faced with asbestos or the like as indicated at 12, and arranged one on each side of the disk 8. These rings are supported on bolts 14—of which there are also three,—mounted in the stationary plate 6 and passing through lugs 15 projecting inwardly from the inside of the rings. The inner ends of said bolts are provided with nuts to take the thrust of the brake, and with washers to permit adjustment of the distance of the farther ring from the plate 6. The ring on the rear side of the disk 8 slides on the bolts 14. Springs 26, shown only in Fig. 4, may be used to hold the rings and disk apart when the brake is not in use.

Various means may be employed to apply the brake, but in all the forms illustrated the action is to first move the ring nearest the fixed plate against the disk and then the latter against the farther ring. In Figs. 1 and 2, this means consists of three inclined cams or wedges 17, formed on the plate 6, which act upon rounded projections 18 formed on the back of a cam disk 16, the face of which bears against the back of the nearer ring 11. The cam disk is provided with three slots 19 by which it is supported on the studs 14. It is oscillated by means of a stud 20, secured to its back and passing through a slot 21 in the plate 6. A rod 22 connects said stud to the operating lever or pedal, not shown, and a spring 23 retracts said rod and stud to release the brake.

In the form illustrated in Figs. 3, 4 and 5, the plates 5 and 6 are omitted, the studs (not shown) for connecting the rotary disk 8 to the wheel being secured in the holes 25 formed in the flange of the wheel hub, while the bolts 14, (here shown as four in number), carrying the non-rotatable friction rings 11, are carried in the outer ends of the arms 26 of a spider, secured to the fixed rear axle tube 3. In this instance, it will be noticed that the rings are supported at their outer periphery and the disk at its inner periphery. In Fig. 4 is shown a coil spring 56 normally holding the rings away from the disk.

The camming action, to apply the brake, is here performed by an oscillatable disk 27, provided on both sides with rounded cam projections 28, which bear on one side on wedges 29, formed on the back of the adjacent friction ring, and on the other side, on the inner inclined face of a U-shaped clip 30,—of which there are four as shown,—secured in any convenient way to the frame, or to the farther friction ring. The means for oscillating the disk 27 is here shown as a crank 31, the pin 32 of which plays in a slot 33 in said disk, the crank being journaled in one of the spider arms 26 and having a lever arm 34 by which it can be rotated.

In the form shown in Figs. 6 and 7, I do away with the cam disk and actuate the brake by means of links 35, constituting a toggle, and secured at one end to the stationary plate 6 and at the other end to the dished center portion of the nearer friction ring 11. The toggle is operated by a crank lever 36, journaled in the plate 6 and connected to the center of the toggle links by rods 37. 22 is the connecting rod and 23 the retracting spring, as in the form of Figs. 1 and 2.

A modified means for operating the toggles is shown in Fig. 8. Here the rods 37 are connected to a yoke 38, within which is an eccentric disk 39 carried by the lever 36. In this case both sets of toggle links are straightened by an upward pull, whereas, in the form of Figs. 6 and 7, one set is straightened by an upward pull and the other set by a downward push.

In Figs. 9 and 10, the farther friction ring is not dished and is forced toward the friction disk 8 by cams 40, pivoted on the stationary axle tube 3 and actuated by the lever 66 and rod 22, the end of said lever being forked to straddle said tube.

Figs. 11, 12 and 13 illustrate the double form of brake, in which there is one rotary disk 8, as before, but two sets of coöperating friction rings, 44, and 45. The outer rings 44 are supported by the bolts 14, mounted in the fixed plate 6 and passing through lugs 46 on the outer periphery of said rings, while the inner rings 45 are supported on similar bolts 14, passing through lugs 47 formed on their inner periphery. The studs 9, for conecting the rotary disk 8 to the wheel, lie in the space between the outer periphery of the rings 45 and the inner periphery of the rings 44.

To actuate the brakes independently, two oscillatable cam rings 48 and 49 are provided, the outer one of which, 49, is slotted at 50 to receive the outer bolts 14, and the inner of which is slotted at 51 to receive the inner bolts 14. Studs 52 and 53 are connected respectively to the backs of said cam rings, pass through slots in the fixed plate 6 and carry connecting rods 22, one of which—that from the outer disk—is preferably connected to a foot pedal not shown, and the other—that from the inner disk,—to a hand lever not shown. In this way there is provided a relatively weak brake for hand operation and a more powerful brake,—owing to the greater diameter of the friction surfaces,—actuated by a pedal.

Naturally, any of the other actuating means hereinbefore described can be used for the double brake in place of the cam disks, but the latter appear to be the most convenient to use therewith.

What I claim is:—

1. A brake for motor vehicles comprising the combination with the wheel, of an annular disk connected to rotate with said wheel but free to move axially, a non-rotatable friction ring on each side of said disk, one of which can move axially and the other of which is held against axial movement away from said disk, an annulus, mounted in the rear of said axially movable ring so as to be capable of a limited circular movement, and provided with cam projections on its face, coöperating cam surfaces on a fixed part of the vehicle, and means, under control of the operator, to oscillate said annulus.

2. A brake for motor vehicles comprising the combination with the wheel, of flanged plates connected to said wheel and to the frame respectively, the flange of one plate overlapping that of the other so as to form a casing for the brake, an annular disk within said casing, studs projecting from the wheel plate through said disk, a friction ring on each side of said disk within said studs, bolts projecting from the frame plate through said rings within said disk, nuts on the inner ends of said bolts to hold the farther ring from movement toward the wheel, and means between the other of said rings and the frame plate to force the last mentioned ring against said disk and the latter against the farther ring.

3. A brake for motor vehicles comprising the combination, with the wheel, of an annular disk connected to rotate with said wheel but free to move axially, studs carried by the wheel and projecting through said disk, a pair of outer friction rings flanking said disk outside said studs and a pair of inner friction rings flanking said disk within said studs, means to support said pairs of rings from a stationary part of the vehicle, and independent means between a stationary part and one of each pair of said rings to force said ring against said disk and the latter against the other ring of that pair.

4. A brake for motor vehicles comprising the combination, with the wheel, of flanged plates connected to said wheel and to the frame respectively, the flange of one plate overlapping that of the other so as to form a casing for the brake, studs projecting from the wheel plate into said casing, an annular disk slidably supported on said studs, bolts projecting from the frame plate into said casing, friction rings mounted on said bolts on each side of said disk, and means, under the control of the operator, to force said rings and disk into contact.

5. A friction brake comprising the combination with a driven shaft and a frame member in which the same is mounted, of flanged plates on said shaft and frame member, respectively, the flanges extending in opposite directions from said plates so as to form a casing, annular friction disks within said casing, one or more of which is connected to rotate with said shaft, the others being non-rotatably carried by the frame, and means connected to said frame member and bearing on the adjacent non-rotatable disk to force the latter away from said member and apply the brake.

6. A friction brake comprising the combination with a driven shaft and a stationary part, of a rotary friction member secured to said shaft, a non-rotatable friction member supported by said stationary part so as to be movable axially, means to hold said rotary member against axial movement away from said non-rotatable member, a cam disk supported by said stationary part so as to have a limited turning movement, cam surfaces on the face of said disk whereby, when it is turned in one direction, it is forced against the back of said non-rotatable member, and manual means for turning said disk.

7. A double friction brake for motor vehicles and the like, comprising the combination with the fixed rear axle, the driving shaft therein, and the wheel connected to said shaft, of flanged plates connected to the wheel and to the axle respectively so as to form an inclosing housing, a circular set of studs projecting inwardly from the wheel plate, two circular sets of bolts projecting inwardly from said axle plate, a friction disk slidably supported on said studs, independent pairs of friction rings, those of each pair being on opposite sides of said disk, slidably mounted on said bolts, nuts on the inner ends of said bolts to resist the thrust on said rings, means mounted between the axle plate and the nearer of the outer pairs of rings to force the latter against said disk, connections whereby said means is actuated by a foot pedal, similar means between said plate and the nearer of the inner pair of rings to force the latter against said disk, and connections whereby said last mentioned means is actuated by a hand lever.

In testimony whereof I have hereunto set my hand.

WILLIAM W. ROACH.